(12) United States Patent
Shapiro

(10) Patent No.: US 8,727,142 B2
(45) Date of Patent: May 20, 2014

(54) DRAWER ORGANIZER FOR DISPARATE HANDLED ITEMS

(76) Inventor: Jennifer Shapiro, West Bloomfield, MI (US)

(*) Notice: Subject to any disclaimer, the term of this patent is extended or adjusted under 35 U.S.C. 154(b) by 125 days.

(21) Appl. No.: 12/908,610

(22) Filed: Oct. 20, 2010

(65) Prior Publication Data
US 2011/0089798 A1 Apr. 21, 2011

Related U.S. Application Data

(60) Provisional application No. 61/253,166, filed on Oct. 20, 2009.

(51) Int. Cl.
*A47F 7/00* (2006.01)

(52) U.S. Cl.
USPC .......................... 211/70.7; 206/553; 248/37.3

(58) Field of Classification Search
USPC .................. 211/70.7, 70.6, 55; 206/349, 553; 248/37.3, 37.6
See application file for complete search history.

(56) References Cited

U.S. PATENT DOCUMENTS

| | | | |
|---|---|---|---|
| 664,031 A * | 12/1900 | Albright | 248/458 |
| 1,407,792 A | 2/1922 | Hatzung | |
| 1,449,177 A * | 3/1923 | Harbaugh et al. | 312/183 |
| 1,661,787 A * | 3/1928 | Chisholm | 248/37.3 |
| 2,354,968 A * | 8/1944 | Pickering | 248/37.3 |
| 2,538,318 A * | 1/1951 | Mitchell | 248/448 |
| 2,686,129 A | 8/1954 | Seiferth | |
| 2,953,255 A * | 9/1960 | Higgins | 211/60.1 |
| 3,305,100 A * | 2/1967 | Barbee | 211/120 |
| 3,703,326 A | 11/1972 | Riviers | |
| 3,822,783 A | 7/1974 | Mortensen | |
| 3,972,120 A | 8/1976 | Cope | |
| 4,497,412 A * | 2/1985 | Labelle | 211/70.7 |
| 4,685,647 A * | 8/1987 | Calhoun | 248/444.1 |
| 5,037,165 A | 8/1991 | Rapp et al. | |
| 5,044,059 A | 9/1991 | De Giulio | |
| D336,182 S * | 6/1993 | Machut | D6/467 |
| 5,339,547 A * | 8/1994 | Fogel | 40/124.01 |
| D378,564 S * | 3/1997 | Hall | D7/637 |
| 5,850,784 A | 12/1998 | Conner | |
| 6,129,219 A * | 10/2000 | Peickert | 211/74 |
| 6,142,315 A * | 11/2000 | Arout | 211/45 |
| D527,957 S * | 9/2006 | Ranieri | D7/637 |
| D537,683 S * | 3/2007 | Tucker | D7/637 |
| 7,975,857 B2 * | 7/2011 | Restis et al. | 211/70.7 |
| 2003/0234205 A1 | 12/2003 | McGuyer et al. | |
| 2006/0000788 A1 | 1/2006 | Sholem | |
| 2006/0152116 A1 | 7/2006 | Shevrin | |
| 2008/0041757 A1 | 2/2008 | Nelson | |
| 2008/0078372 A1 | 4/2008 | Picozza et al. | |

* cited by examiner

*Primary Examiner* — Korie H Chan
(74) *Attorney, Agent, or Firm* — Blue Filament Law PLLC; Avery N. Goldstein

(57) ABSTRACT

A drawer organizer is provided that includes a platform. The platform has a width, a first side, a second opposing side, a top surface, and a bottom surface. Grooves extend into the platform from the top surface. The grooves are adapted to receive a handle of a handled implement and allow the implement head to extend beyond the platform.

19 Claims, 3 Drawing Sheets

DRAWER ORGANIZER FOR DISPARATE HANDLED ITEMS

CROSS-REFERENCE TO RELATED APPLICATIONS

This application claims priority of U.S. Provisional Patent Application Ser. No. 61/253,166 filed Oct. 20, 2009, which is incorporated herein by reference.

FIELD OF THE INVENTION

The present invention in general relates to a drawer organizer and in particular to organizing handled items that vary widely in dimensions within a drawer.

BACKGROUND OF THE INVENTION

Organization of similar objects within the volume of a drawer is readily accomplished with compartments sized to receive the objects. In this way, silverware is regularly sorted and organized, and writing utensils and paperclips all are readily maintained within a drawer space compartment to promote efficient use of the drawer. Representative of such drawer organizers are U.S. Pat. Nos. 3,703,326 and 5,037,165 and U.S. Patent Application Publication 2003/0234205.

Attempts to organize drawers containing a variety of handled implements such as kitchen utensils or tools characterized by different head sizes and head shapes have met with limited success. With a variety of tool head shapes and sizes, parallel dividers that encompass the entire implement tend to be wasteful of space with large-headed implements such as a ladle or claw hammer. While an encompassing compartment efficiently stores numerous small-headed implements such as knives or screwdrivers, the implements tend to be poorly organized and therefore not readily accessible. While custom-molded contours to accommodate specific implements provide both organization and efficient use of drawer space, the custom nature of the contours precludes storage of additional implements or implements of like function yet with different dimensions.

Thus, there exists a need for a drawer organizer to accommodate handled implements having disparate heads.

SUMMARY OF THE INVENTION

A drawer organizer is provided that includes a platform. The platform has a width, a first side, a second opposing side, a top surface, and a bottom surface. Grooves extend into the platform from the top surface. The grooves are adapted to receive a handle of a handled implement and allow the implement head to extend beyond the platform.

BRIEF DESCRIPTION OF THE DRAWINGS

The present invention is further detailed with respect to the following drawings that exemplify visually certain attributes of the present invention. It is to be understood that the scope of the present invention is not limited to that depicted in the accompanying drawings.

DETAILED DESCRIPTION OF THE PREFERRED EMBODIMENTS

Figure 1:
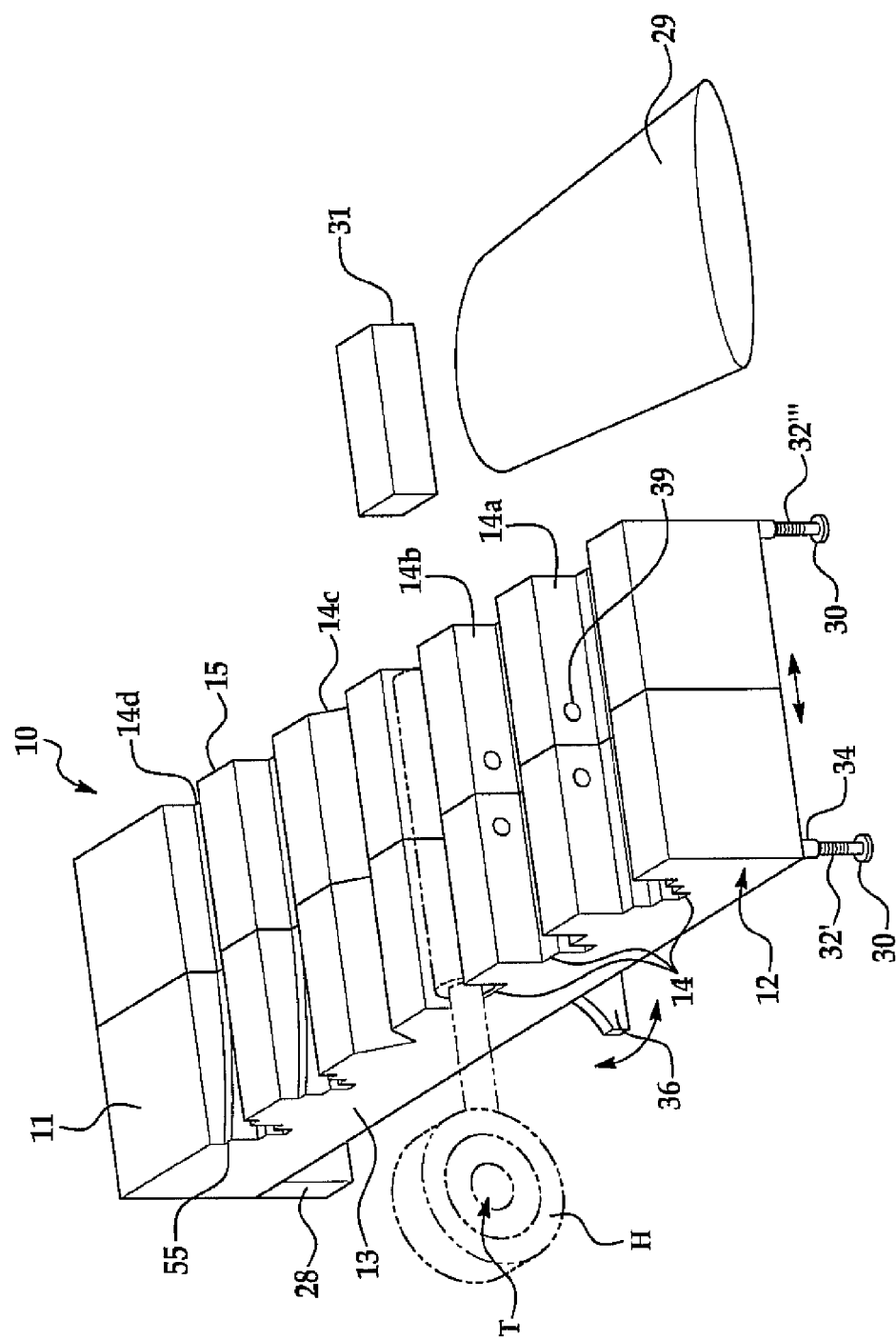
FIG. 1 is a top perspective view of an inventive drawer organizer.
Figure 2A:
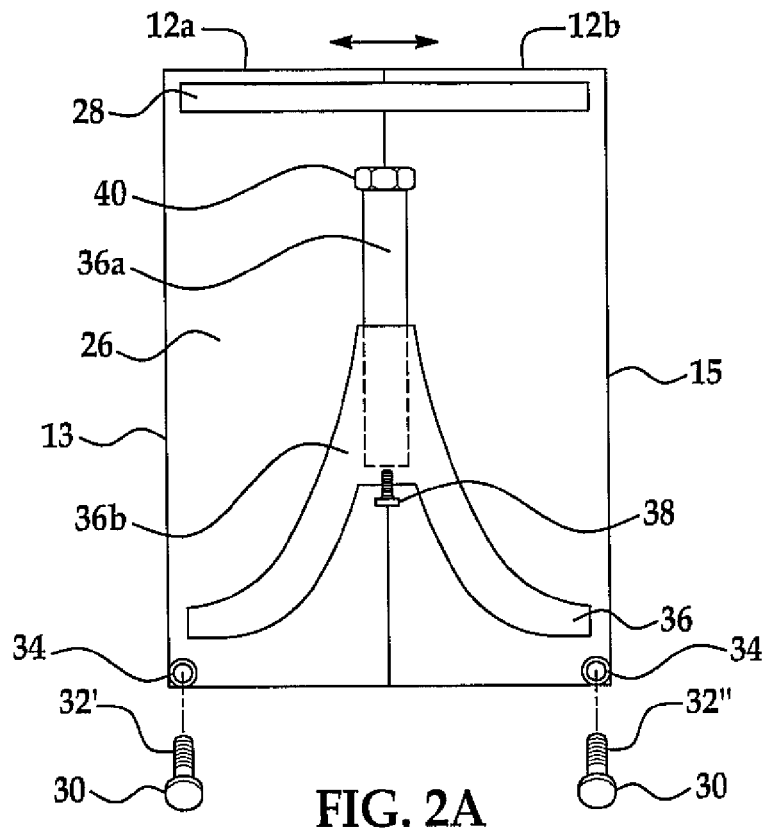
FIG. 2A is an exploded bottom view of the drawer organizer depicted in FIG. 1.
Figure 2B:
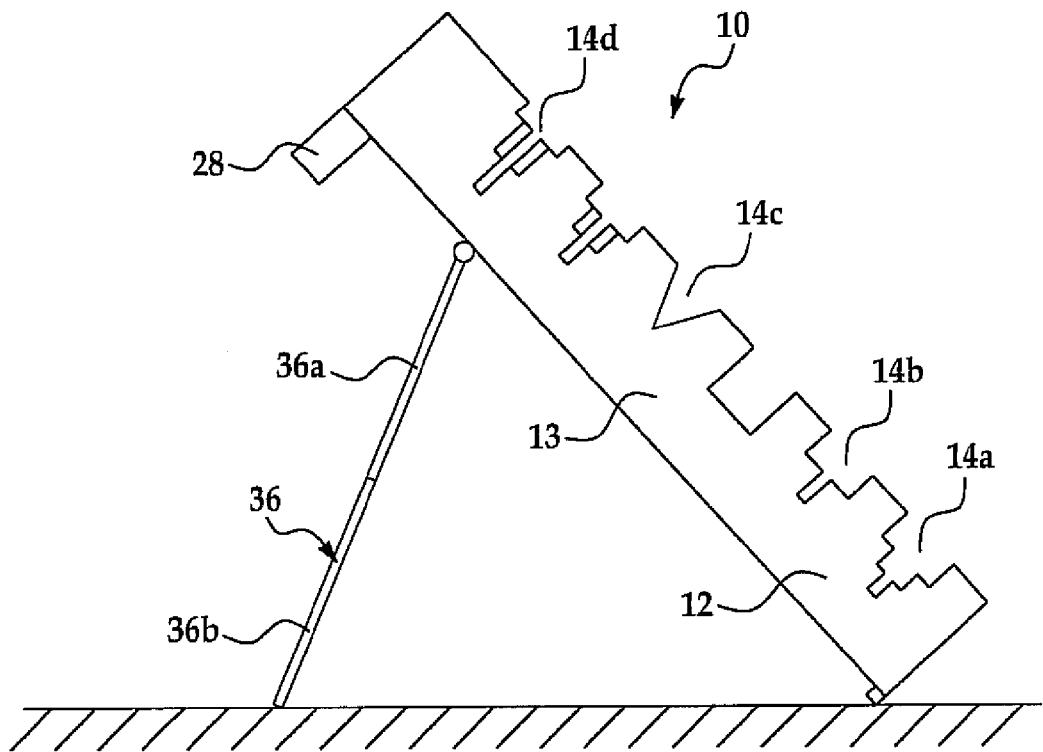
FIG. 2B is a side view of the drawer organizer depicted in FIG. 1 with a deployed prop stand.

The present invention has utility in the organization of a bounded space such as a drawer that contains handled implements having disparate shaped and sized heads. Exemplary of the handled implements as a collection that are particularly well suited for organization according to the present invention include cooking utensils and hand tools. An inventive tool organizer functions by creating an elevated platform having grooves extending across the platform such that a portion of the handled implement upon resting within one of the grooves extends beyond the footprint of the platform thereby allowing a handled implement head to rest in a stable position, even if that stable position is below the parallel axes defined by the groove and the implement handle. Space is efficiently utilized with numerous large-headed handled implements by alternating head direction between adjacent grooves of an inventive drawer organizer. By elevating the grooved platform of an inventive drawer organizer with feet or rails, or a combination thereof, additional storage space for additional objects is created underlying the grooved platform. While numerous projection shapes for a platform are operative herein, a rectilinear block form is depicted as exemplary in the following figures.

Referring now to the figures, an inventive drawer organizer is depicted generally at 10. The organizer 10 has a platform 12 with multiple grooves noted generally at 14 traversing the platform top surface 11. Preferably, the grooves 14 are non-intersecting and, more preferably, are substantially parallel. As used herein, "substantially parallel" is defined as being within 20 degrees of parallel for two grooves of an inventive organizer. The platform 12 has a width along the axial direction of the grooves 14 that is less than the overall length of a handled implement T resting within a groove 14a of the multiple grooves 14. In this way, an oversized or off handle axis tool head H extends beyond and below the platform 12. It is appreciated that multiple handled implements T having oversized or off handle axis heads T best fill the space of a drawer through centering an inventive drawer organizer and alternating the direction of head T between adjacent grooves 14.

A platform 12 is readily formed from a variety of materials illustratively including wood, metal, plastic, and glass. Grooves 14 are appreciated to readily be molded or machined into the platform 12, depending on the nature of the material. A platform 12 is optionally provided with a thickness below the base of a groove 14, but typically between 1 and 4 inches, or alternatively the bottom surface 26 of platform 12 has an elevator to raise bottom surface 26 above a supporting substrate such as a drawer bottom. The elevator is illustratively a spacer 28, a collection of legs 30, or a combination thereof. A spacer 28 operative herein illustratively includes a deformable beanbag 29 or a block 31. It is appreciated that the inventive embodiment depicted in the accompanying figures represents a composite having both a spacer 28 and legs 30. It is appreciated that the elevation of a platform 12 is readily accomplished with a single spacer 28 or at least one additional leg positioned in lieu of the spacer 28. Optionally, a leg 30 includes an adjustment 32. The adjustment 32 illustratively includes threads (32') that engage complementary threads within the platform 12, a series of spaced protrusions or intrusions that engage a complementary feature within a leg socket 34 of the platform 12, or score marks (32") along the leg 30 that facilitate breakage of the leg to a desired length for insertion into leg socket 34. It is appreciated that a nut (not shown) riding on threads 32' to engage socket 34 represents another mode of adjusting and locking the height of organizer 10. Optionally, a platform 12 is equipped with a selectively deployable prop stand 36. The prop stand 36 is particularly well suited to afford ease of access to tools within an inventive organizer during a period of intensive use by providing differential height to each of the grooves 14. A retainer 38 is preferably provided when a prop stand 36 is present to hold the prop stand 36 in a folded configuration when not in use. A hinge 40 is optionally provided to allow prop stand 36 to swing between positions. Optionally, a magnet 39 is provided associated with one of grooves 14 to facilitate retention of a metal handled implement T. Optionally, the prop stand 36 is formed from two slidably engaging portions 36A and 3613 that telescopically interact to provide a user-selected height to prop stand 36.

An inventive platform 12, in addition to being formed from a monolithic or unitary piece of material, is readily formed from two platform pieces 12a and 12b that slidably engage so as to vary the width of an inventive drawer organizer 10 to accommodate the specific dimensions of a handled implement T.

Figure 3:
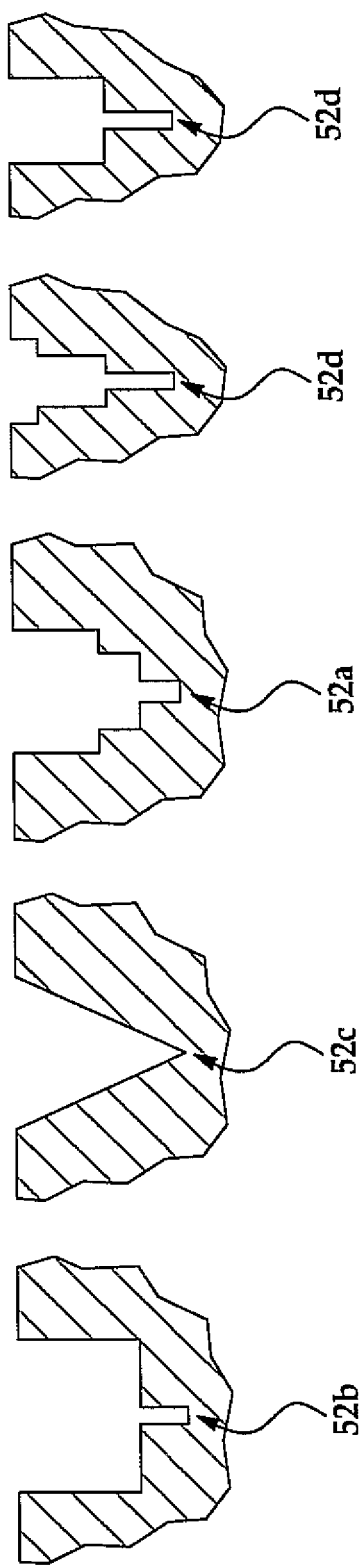
FIG. 3 is a series of side views of different grooves for receiving a handled implement operative within an inventive drawer organizer.

A groove, such as 14a-14d and collectively defined at 14, is each formed having a cross section 52a-52d at the first side 13 of platform 12. While specific grooves 14a-14c have identical cross sections 52a-52c at the opposing second side 15 of platform 12, it is noted that groove 14d has an arcuate surface 55 that results in a different cross section 54d at the opposing second side 15, as shown in FIG. 3. As a result, the low point of groove 14d at side 15 is elevated relative to a low cross section 52d at the first side 13. It is noted that groove 14d having an arcuate feature 55 is particularly well suited for allowing a handle to find an optimal lateral position within the groove based on the balance of a handled implement T. Other exemplary groove shapes that are stepped, rectilinear, and curved are shown with respect to grooves 14a, 14b and 14c, respectively. It is appreciated that an inventive drawer organizer 10 including multiple grooves 14 is able to accommodate a variety of tool types by including at least two different types of grooves shown in the appended figures or different dimensioned grooves having the same cross-sectional shapes. For typical kitchen handled implements, a groove has a width of between 2 and 3 inches and a depth of between 1 and 3 inches.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A drawer organizer comprising:
    a platform having a platform width, a first side, an opposing side to the first side, a bottom surface, and a planar top surface;
    a plurality of separate continuous grooves extending from the top surface towards the bottom surface and spanning the platform width, each of said plurality of separate grooves having a grooved top surface width and a groove profile, each of said plurality of separate grooves is adapted to receive a handle portion of a handled implement with a head of the handled implement extending beyond said platform; and
    wherein the groove profile of at least one groove of said plurality of grooves is narrower towards the bottom surface relative to the top surface and the groove profile of the at least one groove of said plurality of grooves has an arcuate surface extending from the first side to the opposing side wherein the groove profile of said at least one groove of said plurality of grooves has first cross section on the first side and a second cross section on the opposing side that is different that the first cross section, the groove profile transitioning between the first cross section and the second cross section.

2. The drawer organizer of claim 1 further comprising an elevator that raises the bottom surface of said platform above a supporting substrate.

3. The drawer organizer of claim 2 wherein said elevator is a beanbag or a block.

4. The drawer organizer of claim 1 further comprising leg sockets on the bottom surface of said platform and legs adapted to engage said leg sockets to raise said platform above a supporting substrate.

5. The drawer organizer of claim 1 further comprising a prop stand.

6. The drawer organizer of claim 1 further comprising a magnet adjacent to one of said plurality of separate grooves.

7. The drawer organizer of claim 1 wherein said plurality of separate grooves are substantially parallel.

8. The drawer organizer of claim 1 wherein said platform is formed of a first portion engaging a second portion to slidably adjust the platform width.

9. The drawer organizer of claim 1 wherein one of said plurality of separate grooves has a groove width of between 2 and 3 inches and a groove depth of between 1 and 3 inches.

10. The drawer organizer of claim 1 wherein the groove profile of a first groove of said plurality of grooves has a first groove profile and a second groove of said plurality of grooves has a second groove profile different than the first groove profile.

11. The drawer organizer of claim 1 wherein the groove profile of one groove of said plurality of grooves is stepped.

12. The drawer organizer of claim 1 wherein the groove profile of one groove of said plurality of grooves is rectilinear.

13. The drawer organizer of claim 12 wherein the groove profile has a narrow recess extending beneath the groove profile.

14. The drawer organizer of claim 5 wherein said prop stand is telescoping.

15. The drawer organizer of claim 1 wherein said platform is a rectilinear block.

16. A drawer organizer comprising:
    a platform having a platform width, a first side, an opposing side to the first side, a bottom surface, and a planar top surface;
    a plurality of separate continuous grooves extending from the top surface towards the bottom surface and spanning the platform width, each of said plurality of separate grooves having a grooved top surface width and a groove profile, each of said plurality of separate grooves is adapted to receive a handle portion of a handled implement with a head of the handled implement extending beyond said platform;
    wherein the groove profile of a first groove of said plurality of grooves has a first groove profile and a second groove of said plurality of grooves has a second groove profile different than the first groove profile; and wherein said groove profile is narrower towards the bottom surface relative to the top surface and the groove profile of at least two grooves of said plurality of grooves has a multiple stepped cross-sectional shape, and wherein at least one groove of said plurality of grooves has an arcuate surface extending from the first side to the opposing side wherein the groove profile of said at least one groove of said plurality of grooves has a first cross section on the first side and a second cross section on the opposing side that is different that the first cross section, the groove profile transitioning between the first cross section and the second cross section.

17. The drawer organizer of claim 16 further comprising a prop stand.

18. The drawer organizer of claim 16 wherein said platform is a rectilinear block.

19. The drawer organizer of claim 16 further comprising an elevator that raises the bottom surface of said platform above a supporting substrate.

* * * * *